United States Patent
Ohuchi

(10) Patent No.: US 7,907,566 B2
(45) Date of Patent: Mar. 15, 2011

(54) SYSTEM AND INFORMATION PROCESSING METHOD AND APPARATUS

(75) Inventor: Masatomo Ohuchi, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 653 days.

(21) Appl. No.: 11/695,149

(22) Filed: Apr. 2, 2007

(65) Prior Publication Data
US 2007/0237125 A1   Oct. 11, 2007

(30) Foreign Application Priority Data
Apr. 5, 2006 (JP) .................. 2006-104717

(51) Int. Cl.
H04W 4/00 (2009.01)
H04W 72/00 (2009.01)
H04B 7/00 (2006.01)

(52) U.S. Cl. ........ 370/329; 370/328; 370/338; 370/341; 455/450; 455/452.1; 455/453; 455/454; 455/509

(58) Field of Classification Search ............... 370/328, 370/329, 254, 333, 341, 349; 455/421, 509, 455/450, 452.1, 453, 454; 709/200, 225
See application file for complete search history.

(56) References Cited

U.S. PATENT DOCUMENTS

| 6,381,244 | B1* | 4/2002 | Nishimura et al. | 370/395.21 |
| 7,376,099 | B2* | 5/2008 | Tseng et al. | 370/329 |
| 7,453,844 | B1* | 11/2008 | Lee et al. | 370/329 |
| 2002/0176437 | A1 | 11/2002 | Busch et al. | |
| 2002/0188723 | A1 | 12/2002 | Choi et al. | |
| 2004/0202159 | A1* | 10/2004 | Matsubara et al. | 370/389 |

FOREIGN PATENT DOCUMENTS

| JP | 2003-032268 | 1/2003 |
| JP | 2004-520766 | 7/2004 |

OTHER PUBLICATIONS

IEEE Std 802.11h -2003, Oct. 14, 2003, pp. (i)—59, The Institute of Electrical and Electronics Engineers, Inc.

* cited by examiner

*Primary Examiner* — Jinsong Hu
*Assistant Examiner* — Mong-Thuy Tran
(74) *Attorney, Agent, or Firm* — Canon U.S.A., Inc. I.P. Division

(57) ABSTRACT

A plurality of access points for wireless communications and a management apparatus that manages the plurality of access points hold management information that indicates channels used by each of the plurality of access points and an assigning status of bandwidth for each channel. Then, a bandwidth assigning request issued from a wireless station newly connected to a first access point is received via the first access point and a determination is made, based on a bandwidth assigning status of a channel being used by the first access point, as to whether or not bandwidth requested in the bandwidth assigning request is assignable to the channel. When a determination of unassignable is made in the determination, control is conducted to execute exchanging of the channel of the first access point.

9 Claims, 19 Drawing Sheets

FIG. 6

ACCESS POINT MANAGEMENT TABLE 600

| | USED CHANNEL | ESSID | USED BANDWIDTH | REMAINING BANDWIDTH (REFLECTED IN QBSS LOAD) | ASSOCIATED WIRELESS TERMINAL |
|---|---|---|---|---|---|
| AP-a | 1 | ESSID-1 | 0 | 54 | |
| AP-b | 6 | ESSID-2 | 0 | 18 | |
| AP-c | 11 | ESSID-3 | 0 | 54 | |

FIG. 7

TERMINAL MANAGEMENT TABLE 700

| TERMINAL INDEX | TERMINAL IDENTIFIER (MAC ADDRESS) | LEVEL |
|---|---|---|
| STA-a | 00:00:85:00:00:01 | NORMAL |
| STA-b | 00:00:85:00:00:02 | PRIORITY |
| STA-c | 00:00:85:00:00:03 | HIGHEST PRIORITY |

FIG. 8

POLICY LEVELS

| LEVEL | PROCESS DESCRIPTION |
|---|---|
| HIGHEST PRIORITY (URGENT) | IMMEDIATELY EXCHANGE CHANNEL |
| PRIORITY | NOTIFY OTHER TERMINALS AND EXECUTE CHANNEL EXCHANGE PROCEDURE THAT DOES NOT AFFECT COMMUNICATIONS |
| NORMAL | EXCHANGE CHANNEL AFTER PERMISSION FROM OTHER TERMINAL |
| NO RIGHT TO OBTAIN BANDWIDTH | DENY BANDWIDTH REQUEST |

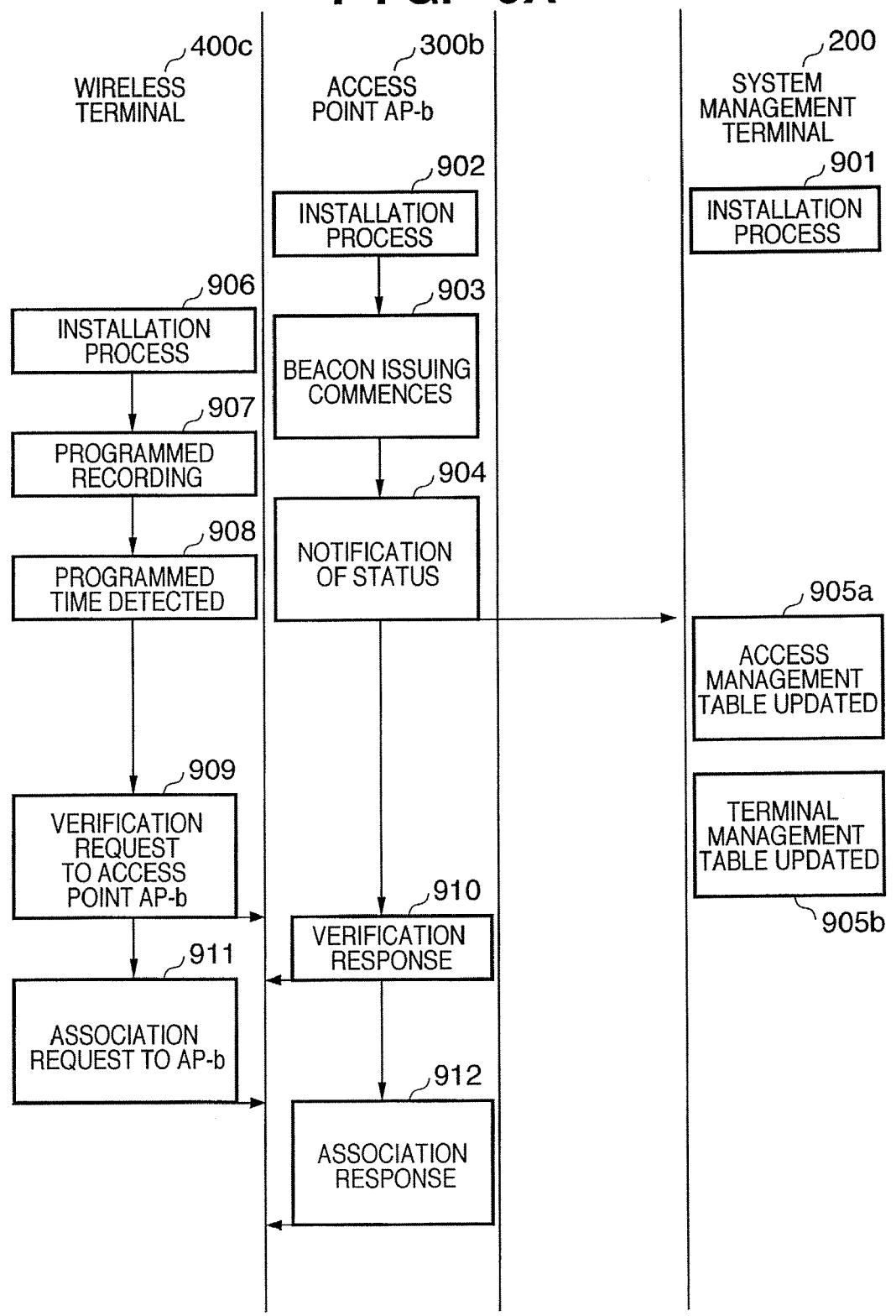

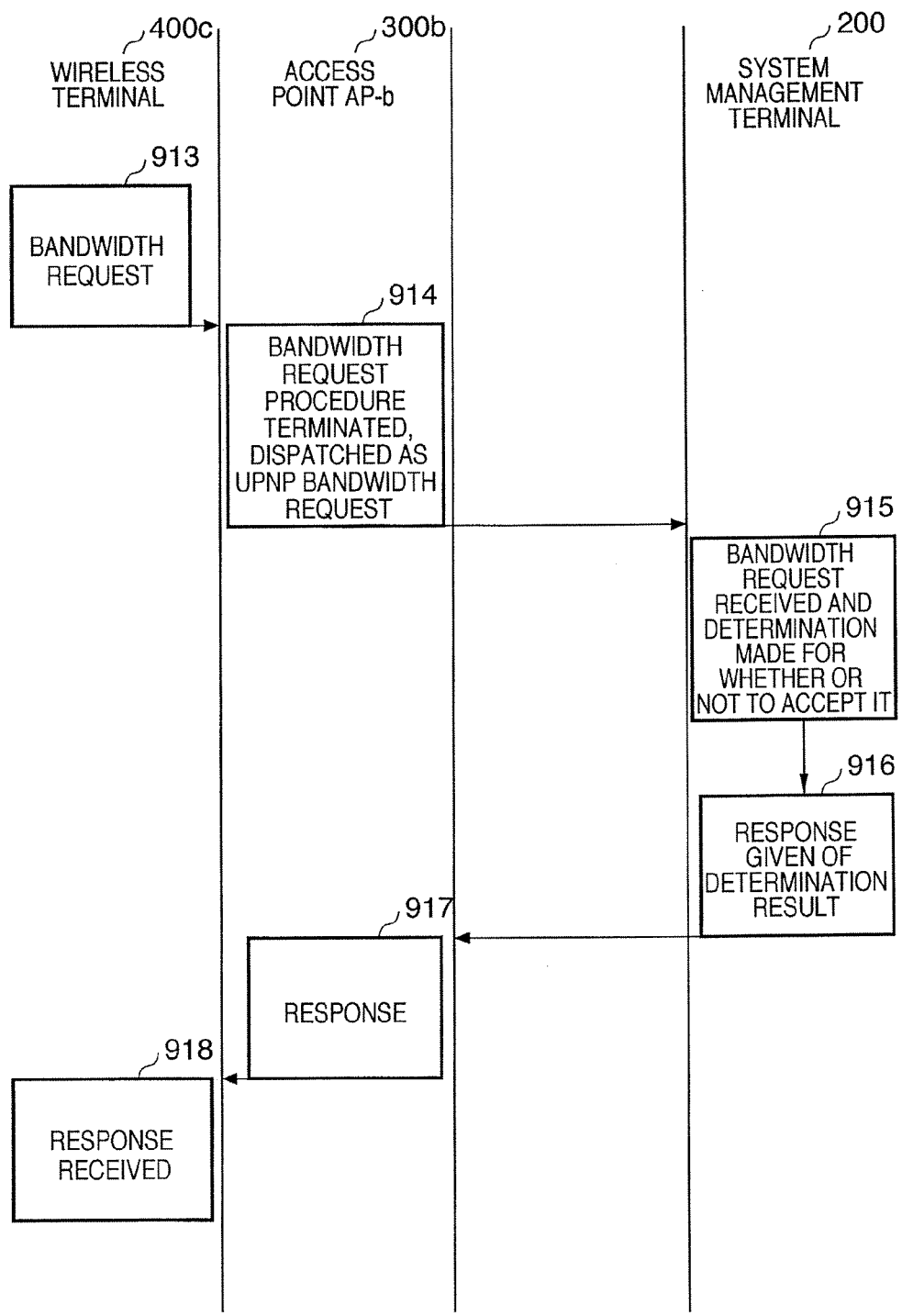

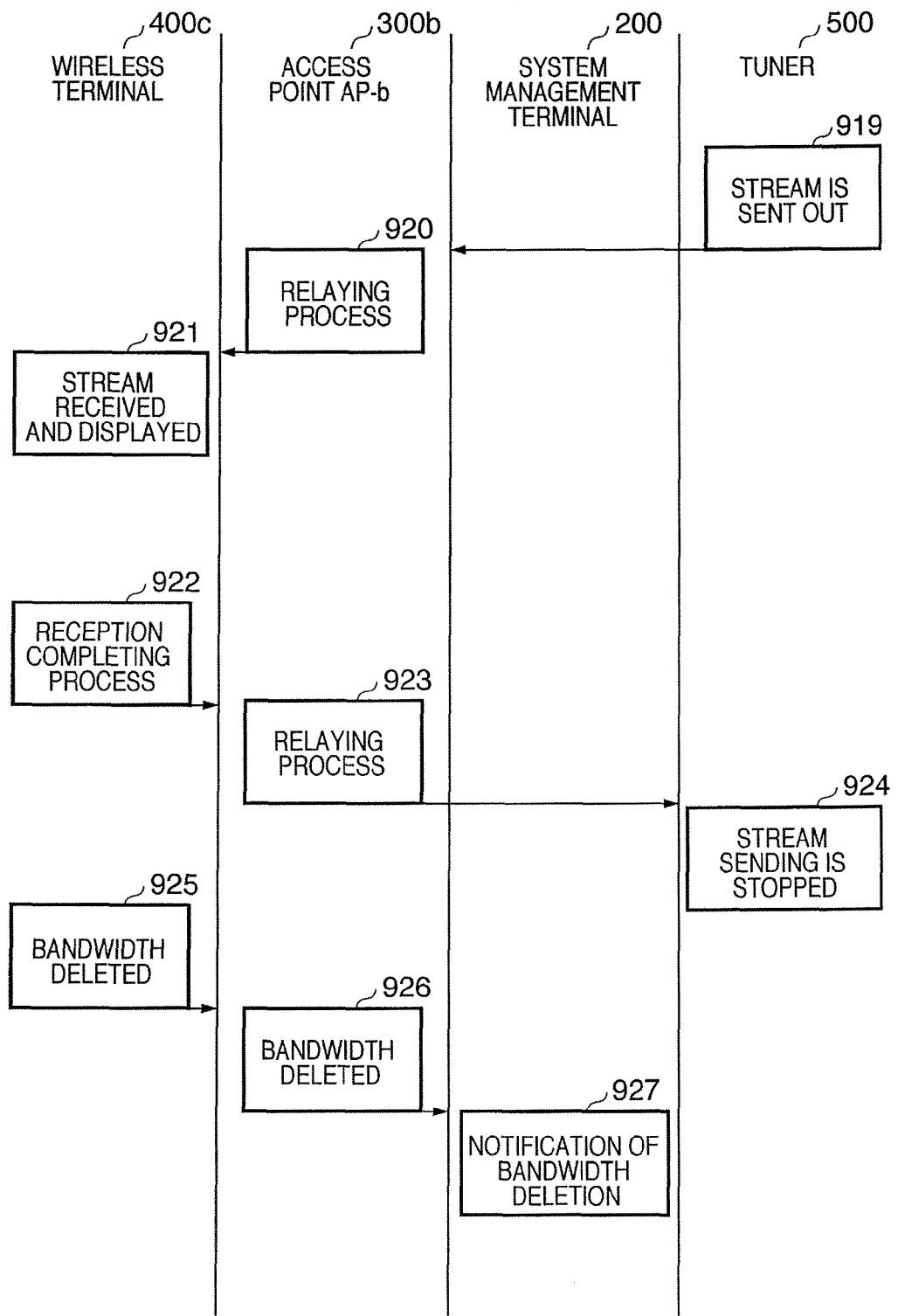

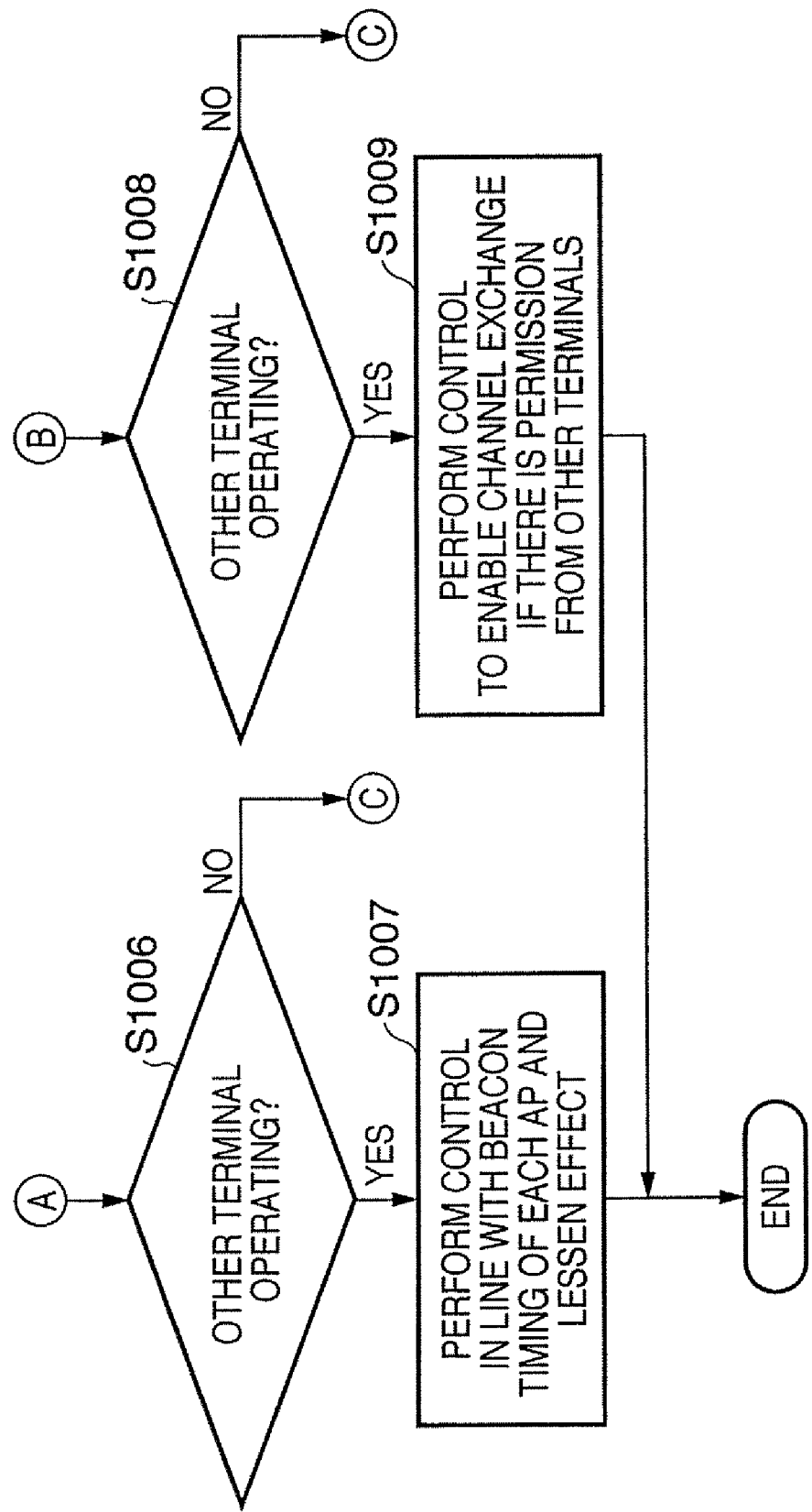

FIG. 11

ADDTS RESPONSE FORMAT

| Order | Information |
|---|---|
| 1 | Category |
| 2 | Action |
| 3 | Dialog Token |
| 4 | TSPEC |
| 5-n | TCLAS(optional) |
| n-1 | TCLAS Processing(optional) |

ACCESS POINT MANAGEMENT TABLE (WORKING EXAMPLE 2)

| | USED CHANNEL | ESSID | USED BANDWIDTH | REMAINING BANDWIDTH | ASSOCIATED WIRELESS TERMINAL |
|---|---|---|---|---|---|
| AP-a | 1 | ESSID-1 | 8 | 46 | STA-a |
| AP-b | 6 | ESSID-2 | 25 | 11 | STA-c |
| AP-c | 11 | ESSID-3 | 54 | 0 | STA-d, STA-e |

ACCESS POINT MANAGEMENT TABLE (WORKING EXAMPLE 3)

| | USED CHANNEL | ESSID | USED BANDWIDTH | REMAINING BANDWIDTH | ASSOCIATED WIRELESS TERMINAL |
|---|---|---|---|---|---|
| AP-a | 1 | ESSID-1 | 32 | 4 | STA-a |
| AP-b | 6 | ESSID-2 | 36 | 18 | STA-c |
| AP-c | 11 | ESSID-3 | 54 | 0 | |

US 7,907,566 B2

SYSTEM AND INFORMATION PROCESSING METHOD AND APPARATUS

BACKGROUND OF THE INVENTION

1. Field of the Invention

The present invention relates to a system and an information processing method and apparatus that carry out channel switching in response to communication conditions.

2. Description of the Related Art

Heretofore various techniques have been proposed for making efficient use of the frequency resources of wireless LAN. US2002/188723 (Japanese Patent Application Laid-Open (Tokuhyo) No. 2004-520766) discloses a mechanism by which a wireless access point is moved to a new channel, more specifically, concerning selecting a channel having a "smallest RSSI (received signal strength indication)" and/or a "smallest CCA (clear channel assessment)." Furthermore, IEEE 802.11h-2003 shows a procedure in which channel quality measurements and switching are carried out with an IEEE 802.11 management frame. Further still, US2002/176437 (Japanese Patent Application Laid-Open No. 2003-32268) discloses a technique in which an optimal channel is selected using a regular channel quality parameter (regCSIQ) and channel exchanges (swaps) are performed among a plurality of access points.

These conventional techniques aim to improve communication quality by switching to another channel when the number of communications terminals connected to a single wireless access point increases and causes competition, which worsens communication quality.

However, in these conventional wireless communications systems, the determination of whether or not it is necessary to switch to a new channel is based on only channel quality resulting from having carried out communications. That is to say, the communication channel is moved after the communication quality has actually worsened. For this reason, in a case where, for example, multicast communications of stream data are received and recorded in real time without buffering, a problem arises of stream data being lost. That is, even for unrecoverable communications such as this, conventional systems carry out a process for improving quality after communications (recording) have begun and quality has worsened.

Along with the spread of wireless products in recent years, channels of multiple frequencies have begun to be used in a single system or living space. In these systems, channels are assigned so that there is no interference in the radio waves to be used. However, the number of channels assignable without interference in IEEE 11b/g and IEEE 11a is from 3 to 8 channels and in environments such as collective housing where many more users than that are concentrated, a multitude of wireless access points become arranged within a communications radius such that the arrangement inevitably results in channel interference.

For this reason, conventionally measures are taken in which reductions are made to the transmit power of the access points and the terminals causing interference to narrow the communications radius of the access points. However, such algorithms, which imply "if interference occurs, lower each other's transmit power," involve reducing one's own transmit power and such reductions in transmit power may also potentially cause problems in wireless communications. For example, when a distance between the access point in a residence of a certain user A and the access point in a neighboring residence is shorter than the distance between the access point and the terminal in the user A's system, reducing the transmit power may disable communications. However, generally access points have wired connections to a wired LAN, and therefore the installation location of the access point is limited and not easy to move. And of course it is not realistic to have the neighboring residence move its access point. Eventually the transmit power is reduced at the position where the access point is currently installed and it becomes impossible to establish a sufficient radio environment between the access point and the terminal.

On the other hand, when access points of a same channel are present within the communications radius, there is a method of maintaining communications by sharing bandwidth of for example 54 Mbps within the channel without reducing the transmit power. However, this eventuates in communication quality deterioration when the total used bandwidth of wireless stations connected to the access points on that channel exceeds 54 Mbps.

SUMMARY OF THE INVENTION

The present invention has been devised in light of these issues and one of features of the present invention is to enable occurrences of communications deterioration to be prevented in advance.

According to one aspect of the present invention, there is provided a system in which a plurality of access points and a management apparatus that manages the plurality of access points are communicably connected and in which a plurality of channels are used, wherein the management apparatus comprises: a holding unit adapted to hold management information that indicates channels used by each of the plurality of access points and an assigning status of bandwidth for each channel; a receiving unit adapted to receive a bandwidth assigning request from a terminal via a first access point; a determining unit adapted to determine, based on a bandwidth assigning status of a channel being used by the first access point, whether or not bandwidth requested in the bandwidth assigning request is assignable to the channel; and a changing unit adapted to change the channel of the first access point in response to a determination by the determining unit.

Also, according to another aspect of the present invention, there is provided an information processing apparatus for managing a plurality of access points, comprising: a managing unit adapted to manage channels used by each of the plurality of access points and an assigning status of bandwidth for each channel; a receiving unit adapted to receive a bandwidth assigning request from a terminal via a first access point; a determining unit adapted to determine, based on a bandwidth assigning status of a channel being used by the first access point, whether or not bandwidth requested in the bandwidth assigning request is assignable to the channel; and a changing unit adapted to change the channel of the first access point in response to a determination by the determining unit.

Furthermore, according to another aspect of the present invention, there is provided an information processing method for managing a plurality of access points, comprising: a managing step of managing channels used by each of the plurality of access points and an assigning status of bandwidth for each channel; a receiving step of receiving a bandwidth assigning request from a terminal via a first access point; a determining step of determining, based on a bandwidth assigning status of a channel being used by the first access point, whether or not bandwidth requested in the bandwidth assigning request is assignable to the channel; and a changing step of changing the channel of the first access point in response to a determination in the determining step.

Further features of the present invention will become apparent from the following description of exemplary embodiments with reference to the attached drawings.

BRIEF DESCRIPTION OF THE DRAWINGS

FIG. 6 is a diagram showing an example of a data structure in an access point management table.

FIG. 7 is a diagram showing an example of a data structure in a terminal management table.

FIG. 8 is a diagram for describing policy levels according to an embodiment.

FIGS. 9A to 9C are diagrams for describing a connection process (bandwidth acquisition process) of wireless stations according to an embodiment.

FIGS. 10A and 10B are flowcharts for describing a process for handling bandwidth requests in the system management terminal of an embodiment.

FIG. 11 shows an ADDTS request format.

FIG. 15 is a diagram showing another example of an access point management table.

DESCRIPTION OF THE EMBODIMENTS

Preferred embodiments of the present invention will now be described in detail in accordance with the accompanying drawings.

Figure 1:
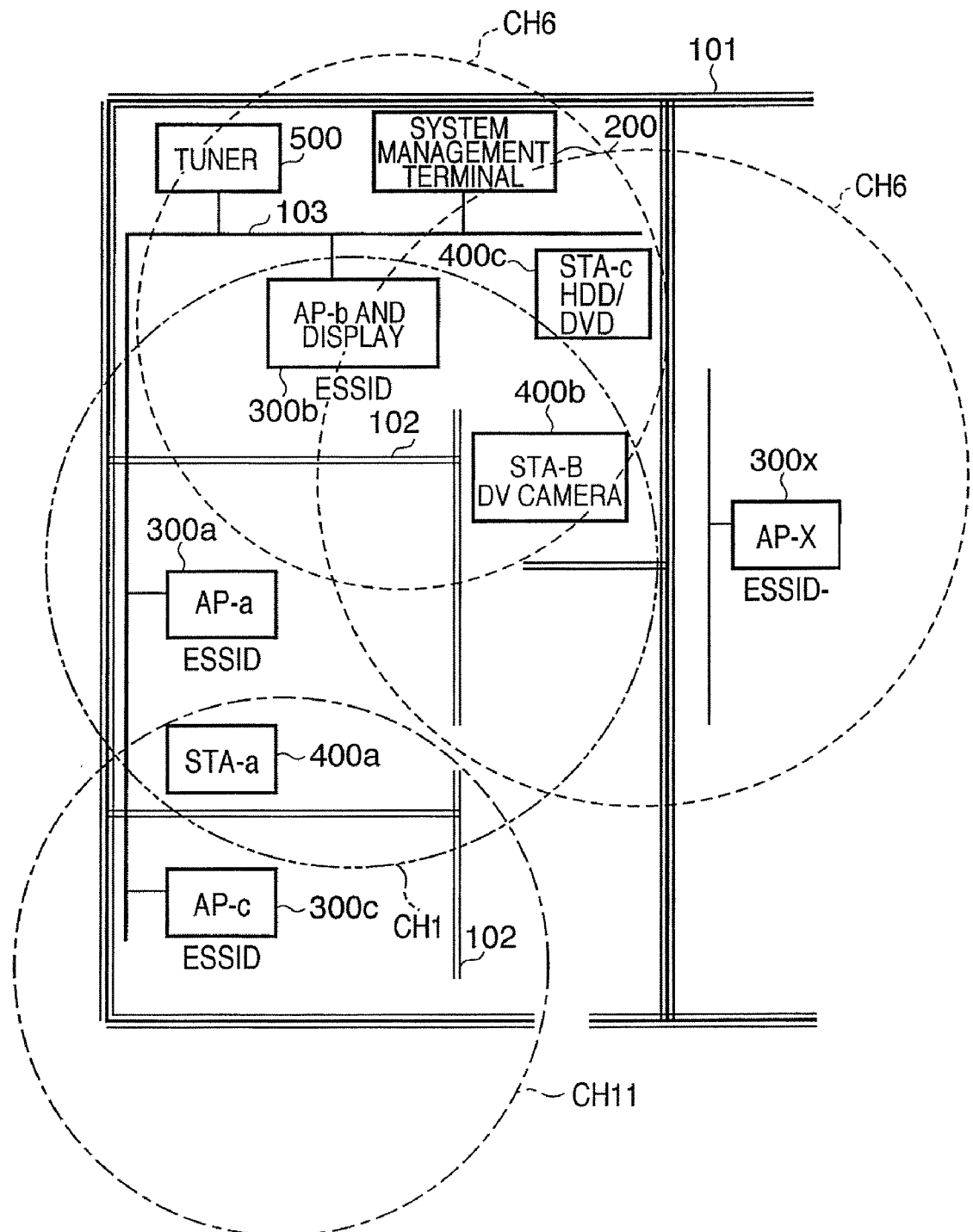
FIG. 1 shows a configuration example of a communications system according to a first embodiment.

FIG. 1 shows a configuration example of a communications system according to the present embodiment. A communications system according to the present embodiment is provided with a system management terminal 200, access points 300a to 300c, and wireless stations (wireless terminals) 400a to 400c such as HDD/DVD recorders, video cameras and the like. It should be noted that in the present specification access point may be abbreviated to AP and wireless stations without an access point function may be abbreviated to STA.

In FIG. 1, the system management terminal 200 manages the entire communications system. A wired LAN 103 is a local area network conforming to IEEE 802.3u or the like. Access points 300a, 300b, and 300c are access points for a wireless LAN. It should be noted that the access point 300b is integrated with a display portion. Wireless stations 400a, 400b, and 400c are provided with a wireless LAN function. In particular, the wireless station 400c is an HDD/DVD recorder, which receives (records) data (stream data) from a tuner 500 via the access point 300b. The wireless station 400b is a digital video camera provided with a wireless LAN function. An access points 300x is a wireless LAN access point outside the management of the system management terminal 200. The tuner 500 is a tuner for receiving analog broadcasts or digital broadcasts. The tuner 500 receives signals from an antenna (not shown in drawings) through a coaxial cable and sends the content of the broadcast to the wired LAN 103 as TCP/IP packets or the like.

Numerals 101 and 102 indicate partitions (walls and the like) in the space of the collective housing or the like in which the communications system operates. Visible light is blocked by the partitions 101 and 102 and audible sound is also greatly dampened.

Figure 2:
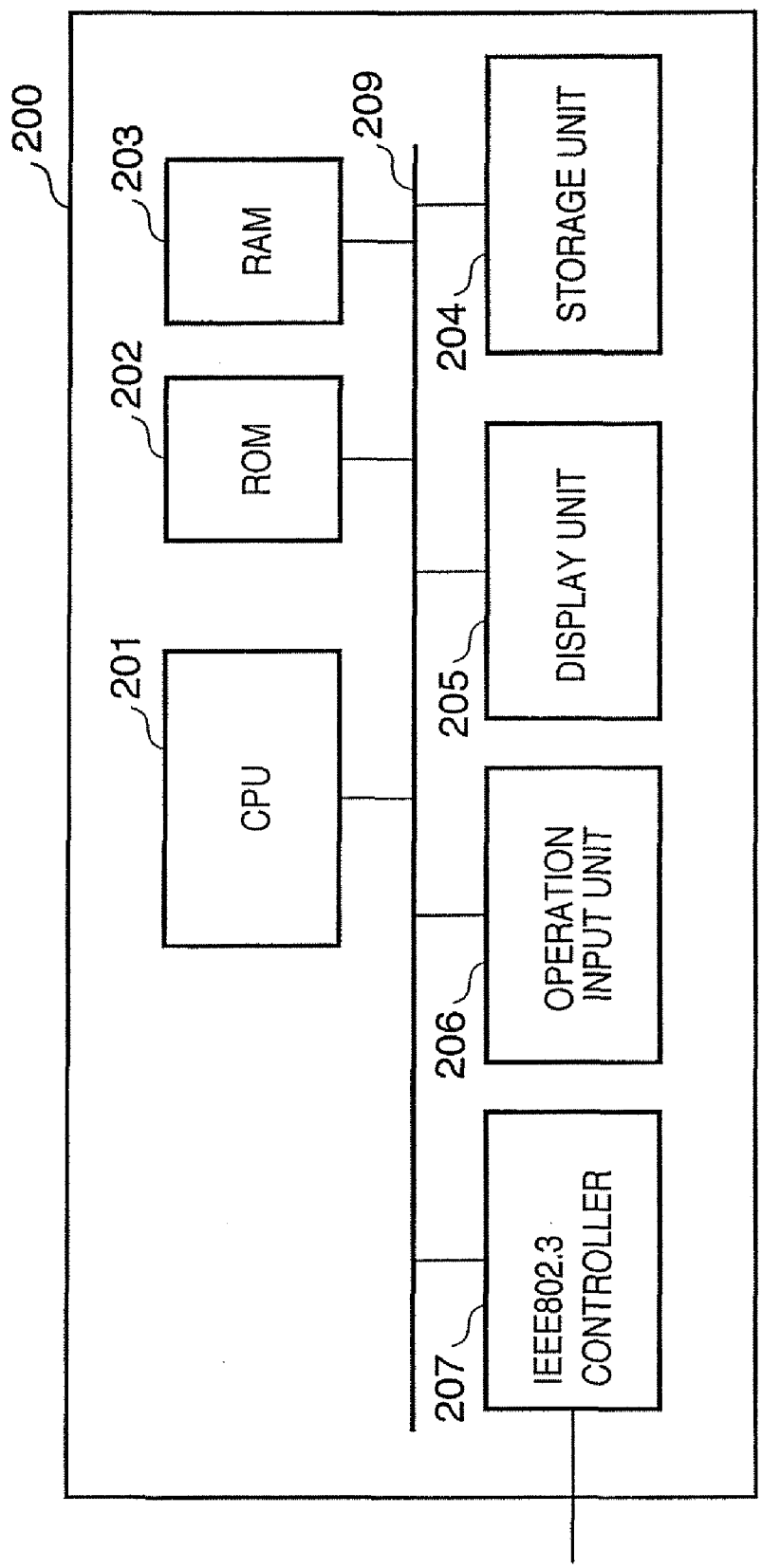
FIG. 2 is a block diagram showing a configuration example of a system management terminal.

FIG. 2 is a block diagram showing a configuration of the system management terminal 200 according to the present embodiment. A CPU (central processing unit) 201 controls the entire system management terminal 200. A ROM (read-only memory) 202 is a semiconductor memory for accommodating programs and parameters that do not require to be changed. A RAM (random access memory) 203 is a memory for temporarily storing programs and data supplied from external devices. A storage unit 204 accommodates application programs and the like to be executed by the system management terminal 200.

The storage unit 204 for example is constituted by a hard disk or memory card fixedly installed in the system management terminal 200. Alternatively, the storage unit 204 may include a flexible disk (FD), an optical disk such as a compact disk (CD), a magnetic card, an optical card, an IC card, or a memory card or the like, which are detachable from the system management terminal 200. A display unit 205 is constituted by a liquid crystal display for example and displays data held by the system management terminal 200 and supplied data and the like. Numeral 206 indicates an operation input unit constituted by a pointing device or a keyboard or the like and inputs data (signals) into the unit in response to operation by the user. Numeral 207 indicates a network controller conforming to IEEE 802.3. A system bus 209 communicably connects each of the above-mentioned units 201 to 207.

Figure 3:
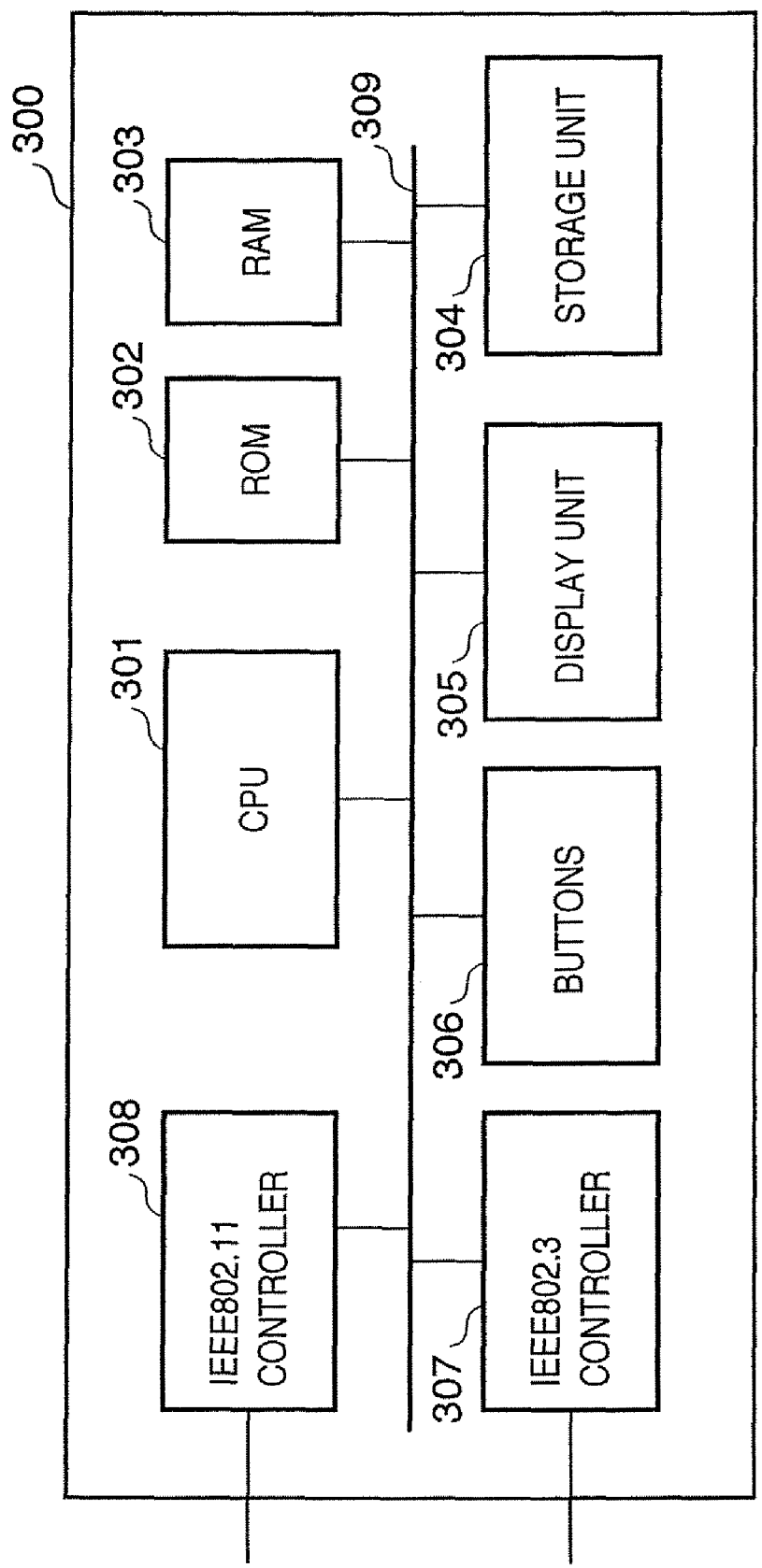
FIG. 3 is a block diagram showing a configuration example of an access point.

FIG. 3 is a block diagram showing a configuration of the access points 300a, 300b, and 300c (hereinafter referred to collectively as access points 300) according to the present embodiment. Hereinafter, when access points are referred to collectively, the term access point(s) 300 will be used. The access point 300 has a CPU 301, a ROM 302, a RAM 303, a storage unit 304, a display unit 305, and an IEEE 802.3 controller 307. These are the same as the CPU 201, the ROM 202, the RAM 203, the storage unit 204, the display unit 205, and the IEEE 802.3 controller 207 described above in FIG. 2. Buttons 306 are used by the user to set wireless parameters in the access point 300 and achieve synchronization with wireless stations. An IEEE 802.11 controller 308 carries out wireless LAN communications conforming to IEEE 802.11. The IEEE 802.11 controller 308 is provided with transceiving functionality of a physical layer according to IEEE 802.11a/b/g or a draft of IEEE 802.11n, etc. and a MAC (medium access control) layer, and measures an RSSI (received signal strength indicator) or the like.

Figure 4:
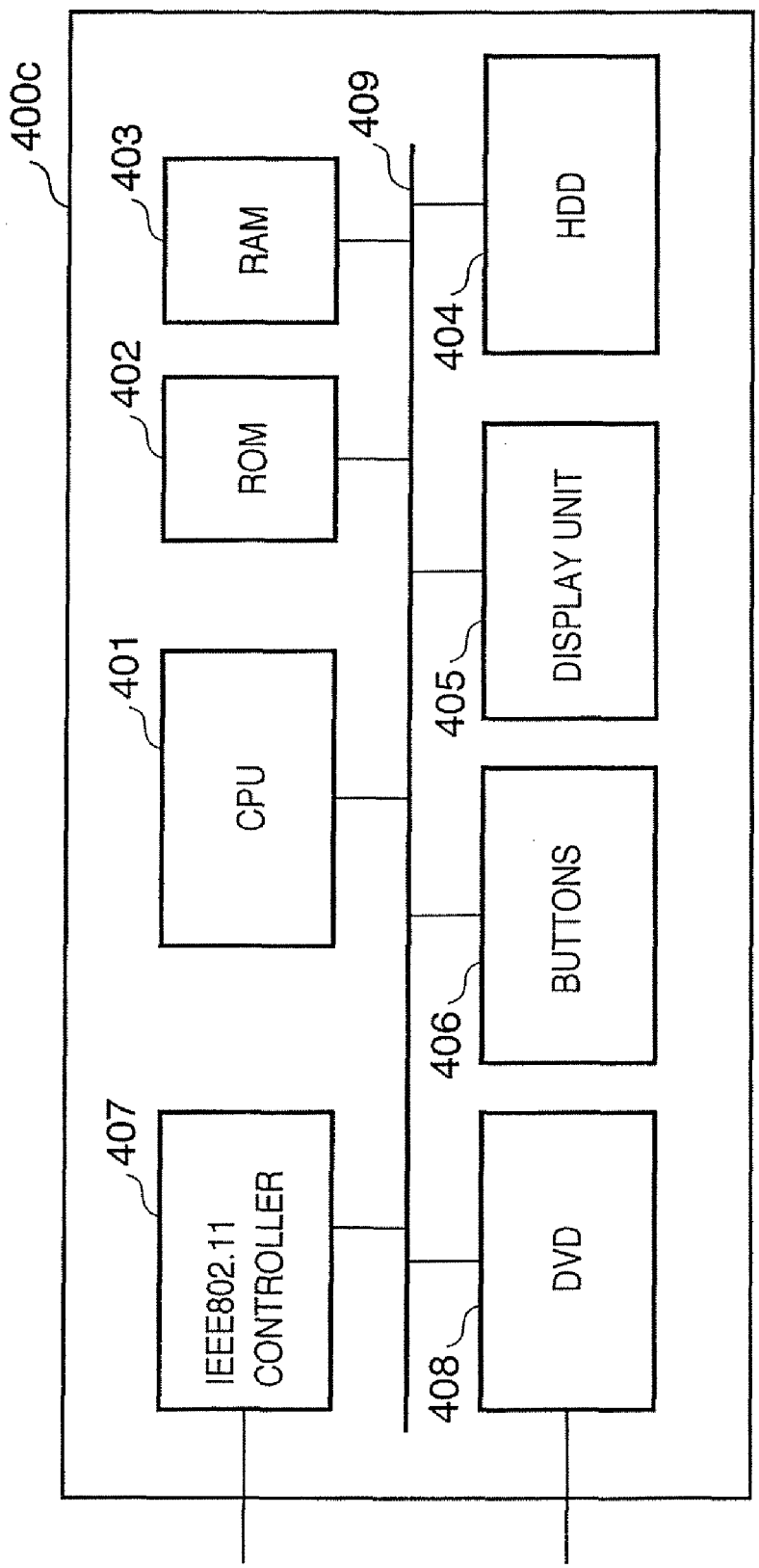
FIG. 4 is a block diagram showing a configuration example of a wireless station.

Next, a configuration of wireless stations 400a, 400b, and 400c is described, but here description will be given concerning wireless station 400c as a representative example. FIG. 4 is a block diagram showing a configuration example of the wireless station 400c (HDD/DVD recorder). The wireless station 400c is provided with a CPU 401, a ROM 402, a RAM 403, and an IEEE 802.11 controller 407 in a same manner as the access points 300. A hard disk drive (HDD) 404 and a DVD drive 408 accommodate application software to be executed by the CPU 401. Furthermore, broadcasted content sent from the tuner 500 can be recorded on the HDD 404 and the DVD 408. A display unit 405 notifies the user concerning operation conditions of the unit and the like. Buttons 406 are used in various operations of the wireless station 400c (for example, operations when the user sets wireless parameters).

Figure 5:
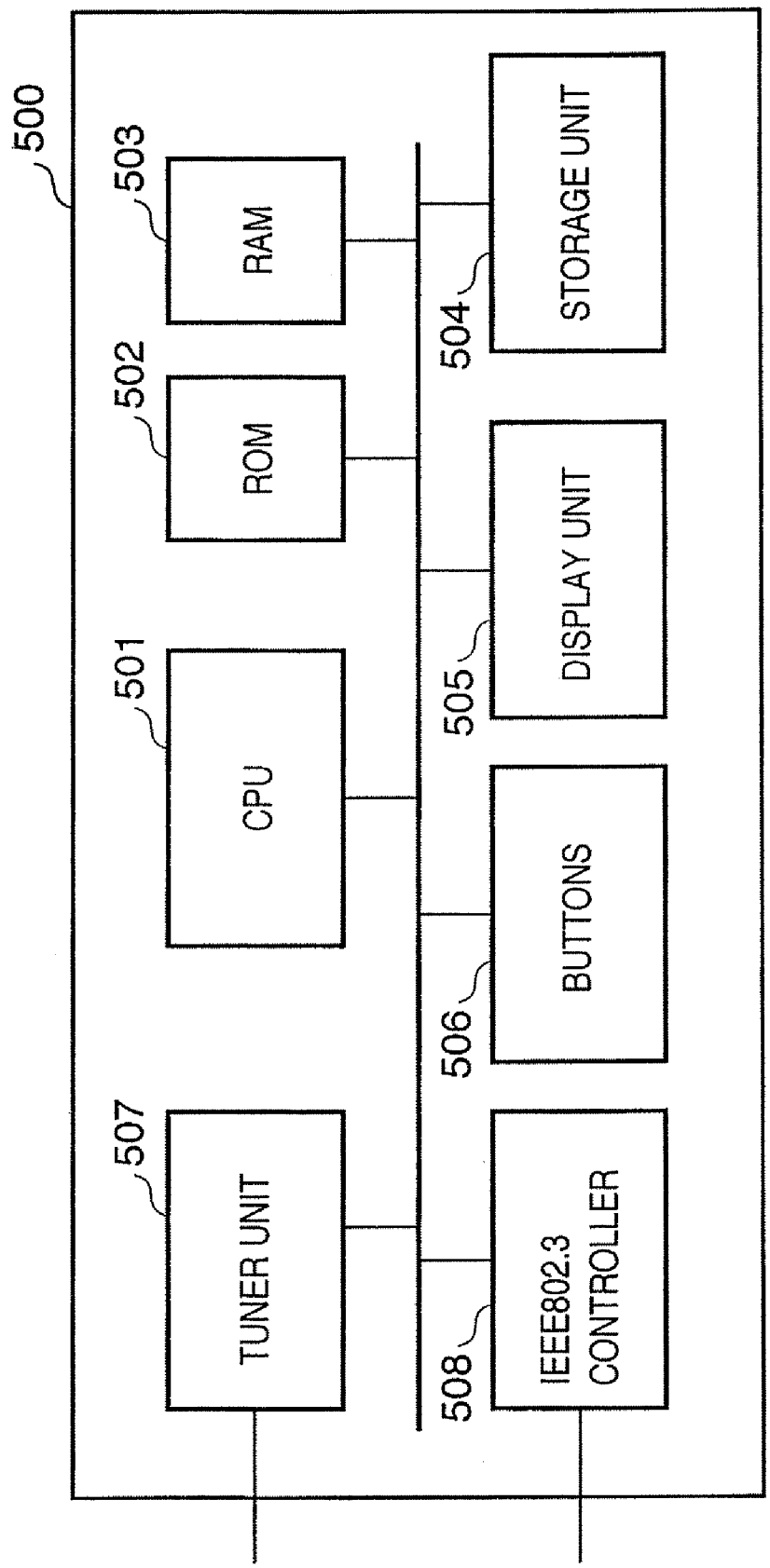
FIG. 5 is a block diagram showing a configuration example of a tuner.

FIG. 5 is a block diagram showing a configuration example of a tuner 500 according to the present embodiment. The tuner 500 has a CPU 501, a ROM 502, a RAM 503, a storage unit 504, a display unit 505, and an IEEE 802.3 controller 508. These have the same function as the CPU 201, the ROM 202, the RAM 203, the storage unit 204, the display unit 205, and the IEEE 802.3 controller 207 described above in FIG. 2. Operation buttons 506 enable channel selection operations and the like by the user. A tuner unit 507 receives broadcasts and data communications and the like.

Operation of the communications system of the present embodiment provided with the above-described configurations is described based on the flowcharts of FIGS. 9A to 9C and FIGS. 10A and 10B.

First, the user of the present system installs (step 901) the system management terminal 200. Following this, the access points (the access points 300a, 300b, and 300c in the present example) are installed (step 902). In FIGS. 9A to 9C the access point 300b is shown as an example. Operation commences (step 903) for each of the installed access points with their respective channels and ESSID (network identifiers) and the system management terminal 200 is notified of the status of each access point (step 904). The system management terminal 200 holds the status of each access point notified of from each access point in an access point management table 600 as shown in FIG. 6. It should be noted that the access point management table 600 is held in the storage unit 204 (or the RAM 203). Also note that AP-a, AP-b, and AP-c in the access point management table 600 shown in FIG. 6 indicate the access points 300a, 300b, and 300c respectively.

Information held in the access point management table 600 includes:

A "used frequency channel" indicating the channel that each access point uses,

An "ESSID" of each access point,

A "used bandwidth" indicating the bandwidth being used that has been assigned to wireless stations at each access point, A "remaining bandwidth" indicating a usable bandwidth at each access point (the bandwidth remaining after the bandwidth that is being used is subtracted from all the bandwidth that the access point can use), and An identifier of the terminal associated with each access point.

It should be noted that a structure of IEEE 802.11e access points is prescribed so that information of the number of associated terminals, wireless channel usage efficiency, and remaining amount of wireless media (remaining bandwidth) is set and notified to the terminals in response to beacons and probe responses. Thus, the system management terminal 200 holds and updates (step 905a) these values.

The exchange of these sets of information is in accordance with standards such as IEEE and industry standards, or independent procedures. Examples of industry standards include for example procedure between a QoS manager and a policy holder in an UPnP QoS architecture. When employing an UPnP QoS architecture, the access point 300 corresponds to the QoS manager and the system management terminal 200 corresponds to the policy holder. Note however that in the present embodiment, it is sufficient that the above-mentioned information (at least the used channel and used bandwidth, remaining bandwidth) is transmitted to the system management terminal 200.

Next, when the wireless station 400c is installed (step 906) in the present system, the wireless station 400c is registered (step 905b) in a terminal management table 700 (FIG. 7) of the system management terminal 200. This registration may be carried out manually by the user or may be carried out automatically by UPnP (Universal Plug and Play), or by a combination of these. The contents of the registration include an index to identify terminals, a MAC address, and a policy level. In the index to identify terminals, STA-a, STA-b, and STA-c indicate the wireless stations 400a to 400c respectively. The policy level indicates "the behavior as a system when a terminal requests wireless bandwidth and when although there is no spare bandwidth in the frequency band being used by the terminal, there is spare bandwidth at another frequency." As mentioned below, the system management terminal 200 of the present embodiment can exchange channels between access points according to multiple types of procedures (also, referred to as "switch channels" and "change channels"). In the present embodiment, a determination is made as to which of these multiple procedures is to be used in accordance with the policy level. That is, in the present embodiment, policy level refers to information indicating which procedure to use and execute for each wireless station when channel exchange becomes necessary.

FIG. 8 shows an example of policy levels according to the present embodiment. In the present embodiment, the levels are in four grades, "highest priority," "priority," "normal," and "no right to obtain bandwidth." Then, a channel exchange procedure for each level is set as follows for when the requested bandwidth is greater than the available bandwidth and when there is available bandwidth up to the requested bandwidth on another channel. Namely:

For terminals having the "highest priority" level, a channel exchange is carried out immediately regardless of whether or not there is an effect on communications to other terminals.

For terminals having the "priority" level, notification of the channel exchange is given to other terminals and a channel exchange is executed so as to not affect communications, for example, by performing the channel exchange when the beacon timings of each terminal is in agreement.

For terminals having the "normal" level, a procedure is executed in which a channel exchange is performed after permission from other terminals.

For terminals having the "no right to obtain bandwidth" level, notification is given to the effect that there is insufficient bandwidth and no channel switching or exchange is performed.

It should be noted that the form of setting the policy level in the present example involves, for example, setting the policy level to "highest priority" for the wireless station 400c (STA-c) according to a device classification of HDD/DVD recorder. That is, the policy level is fixed for each device classification of the terminals. However, there is no limitation to this form of settings and, for example, these may be set to change dynamically by distinguishing between programmed recording and manual playback and setting the policy level to highest priority only for times of programmed recording. In this case, the system management terminal 200 switches the policy level of the wireless station 400c in response to notification from the wireless station 400c regarding its "playback/recording" operational status. For example, when an editing task or like is performed through file transfer and startup or shutdown is carried out manually, this case is not a condition for "the HDD/DVD recorder to use a large capacity bandwidth in an overriding manner." Accordingly, the policy level can be a lower level rather than the highest priority. After this, when the time for programmed recording is approaching, the policy level can be raised (changed) to "highest priority." The policy level is set to highest priority, because communications are being carried out mechanically, and therefore manual adjustments cannot be made.

A return is now made to description of an operational procedure of the wireless station 400c (HDD/DVD recorder) with reference to FIG. 9A. At step 907, the user performs settings for programmed recording at the wireless station 400c. After this, time passes and the wireless station 400c detects (step 908) that the programmed time is approaching. It should be noted that a time device is included in the CPU 401. Upon detecting the approach of the programmed time, the wireless station 400c establishes wireless communications with the access point 300b. First, the wireless station 400c carries out a verification request (step 909) to the access point 300b. Selection of the access point may be carried out manually by the user or may be carried out automatically. When the access point 300b returns an affirmative response (step 910) in response to the verification request, the wireless station 400c carries out an association request (step 911) to the access point 300b. In response to the association request, the access point 300b associates itself to the wireless station 400c and returns an association response (step 912) to the wireless station 400c.

In IEEE 802.11e, terminals are capable of requesting the bandwidth they need from the access points. That is, the access point can be aware of the required bandwidth before commencing communications. In the present embodiment, channel control is carried out using this arrangement for bandwidth requests.

The wireless station 400c derives the required bandwidth from information of the programmed recording and carries out (step 913) a bandwidth request (requests an average rate value to be maintained) conforming to IEEE 802.11e. In the present example, the wireless station 400c requests a bandwidth having an average rate of 20 Mbps. The access point 300b terminates the IEEE 802.11e procedure and sends an UPnP bandwidth request to the system management terminal 200. In the present embodiment exchanges between the wireless station 400c and the access point 300b are carried out using a procedure of IEEE 802.11e, and exchanges between the access point 300b and the system management terminal 200 are carried out using an UPnP procedure. That is, bandwidth requested using an IEEE 802.11e procedure is requested to the system management terminal 200 using an UPnP procedure. When this happens, the MAC address of the wireless station 400c actually making the request is added to the request using the UPnP procedure and transferred (step 914). In regard to this bandwidth request, the system management terminal 200 determines (step 915) whether or not to accept it, whether or not to execute a channel exchange, and an execution procedure (a procedure corresponding to the policy level). Then, in accordance with the determinations of step 915, the system management terminal 200 sends (step 916) instructions for channel exchanging to the various access points that are to perform channel exchanges.

Figure 12:
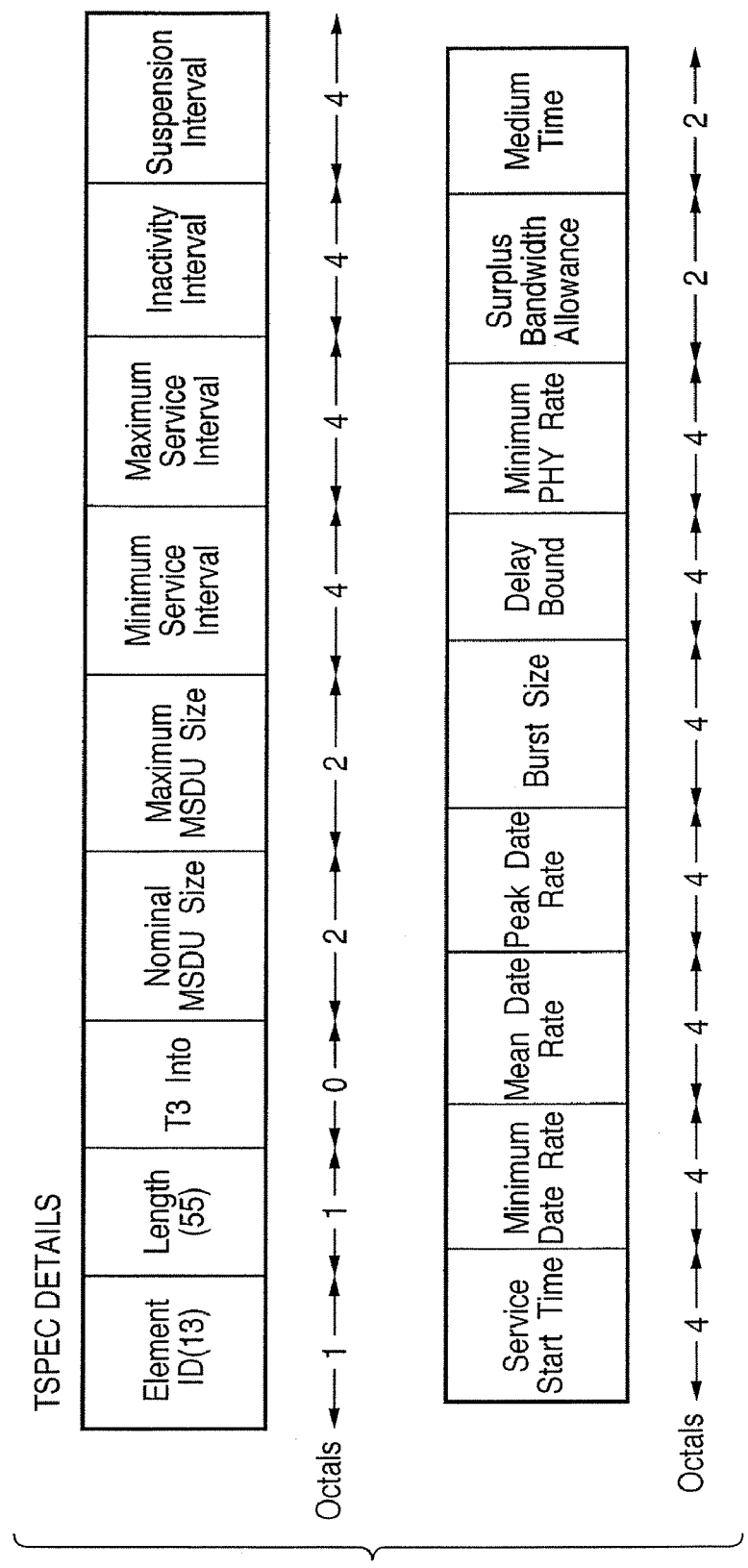
FIG. 12 shows details of TSPEC.

FIG. 11 shows a bandwidth request frame format (ADDTS request format), which is prescribed in IEEE 802.11e and is used for transfers from the terminals to the access points. In the above-mentioned step 913, a request in this format is issued from the wireless station 400c to the access point 300b. Characteristics of bandwidth to be requested are described in "TSPEC." FIG. 12 shows a detailed data structure of "TSPEC" indicating characteristics of bandwidth to be requested. Bandwidth to be requested is described in "mean data rate" (FIG. 12) within "TSPEC." In the case of the present example, the mean data rate here (a 4-byte number at bit/sec) is set to 20 Mbps.

When a determination is made at step 915 as to whether or not to accept the bandwidth request and procedure for channel exchange, the result thereof is notified (step 916) to the access point and a response to the bandwidth request is notified (steps 917 and 918) to the wireless station 400c.

Figure 10A:
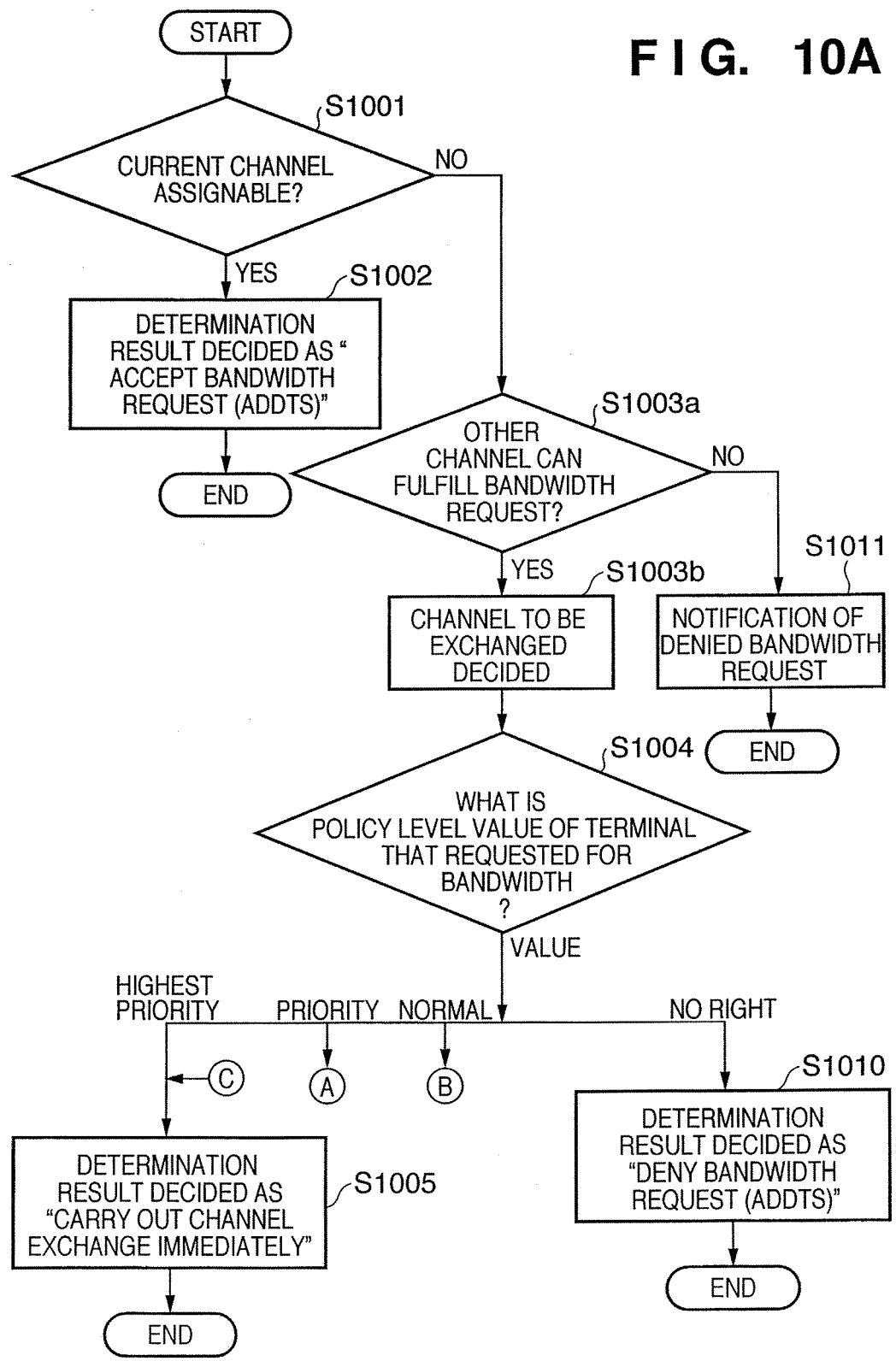

Next, detailed description is given with reference to the flowcharts in FIGS. 10A and 10B regarding the processing at steps 915 and 916 (whether or not to accept the bandwidth request, the determination of the procedure for channel exchange, and access point control).

At step S1001, the system management terminal 200 references the access point management table 600 (FIG. 6) to determine whether or not the bandwidth requested of the current channel is assignable with the access point 300b. If this is possible, the bandwidth request is accepted at step S1002. As a result, the wireless station 400c is able to achieve wireless communication via the access point 300b with the request bandwidth.

In the present example, from the access point management table 600 shown in FIG. 6, the current state of the access point 300b (AP-b) is an assignable bandwidth of 18 Mbps. Accordingly, at the above-mentioned step S1001, a determination is made that this is unassignable. In the present example, as shown in FIG. 1, channel 6 of the access point 300b interferes with channel 6 of the access point 300x, and therefore the effective bandwidth is 18 Mbps.

When a determination of unassignable is made at step S1001, the process proceeds to step S1003a and the system management terminal 200 determines whether or not there is another channel that can fulfill the bandwidth request. In the present example, confirmation is made as to whether or not there is a channel capable of being assigned a bandwidth of 20 Mbps. If there is no channel capable of being assigned the bandwidth according to the bandwidth request, then maintaining a 20 Mbps bandwidth is itself impossible. Accordingly, the procedure proceeds to step S1011 and it is decided to "deny the bandwidth request," and a response giving notification to this effect is returned to the wireless station 400c.

According to the access point management table 600 of the present example, channel 1 and channel 11 have spare bandwidth, and therefore the process proceeds from step S1003a to step S1003b and the channel to be exchanged is decided. Then the process proceeds to step S1004. It should be noted that when there is no used bandwidth as shown in the management table 600 of FIG. 6, it is not necessary to consider this. However, when there is used bandwidth as shown in the access point management table 600 of FIG. 13, then it is necessary to consider this.

Figure 13:
FIG. 13 is a diagram showing another example of an access point management table.

For example, in the state shown in FIG. 13, when a bandwidth request for 20 Mbps occurs at AP-b, first, since the remaining bandwidth is 11 Mbps<20 Mbps, a search is made for an exchangeable channel. In this case, a search is made for a channel capable of being assigned a total of the used bandwidth and the requested bandwidth (25 Mbps+20 Mbps=45 Mbps). In the case of FIG. 13, the usable bandwidth of both channel 1 and channel 11 is 54 Mbps and therefore either channel is capable of being assigned a bandwidth of 45 Mbps. However, at channel 11 the used bandwidth is 54 Mbps so when exchanging channel 6 and channel 11, there is a possibility that a bandwidth of 54 Mbps cannot entirely be assigned at the access point AP-c to which channel 6 is assigned. On the other hand, channel 1 has a used bandwidth of 8 Mbps, so no problem will occur in the used bandwidth if channel 6 and channel 1 are exchanged. Consequently, in this case, channel 1, that is, the access point AP-a is selected as a target for the channel exchange at step S1003b.

At step S1004, the policy level of the terminal that sent the bandwidth request is confirmed using the terminal management table 700 (FIG. 7) and processing diverges in accordance with the value of the policy level.

The policy level of the wireless station 400c (STA-c) that issued the bandwidth request is "highest priority." Accordingly, processing proceeds from step S1004 to step S1005. At step S1005, a determination is made to "carry out a channel exchange immediately" and an instruction for the channel exchange is sent to the targeted access point. For example, when it is determined to change the channel of the access point 300b to "1", the access point 300b is instructed to exchange immediately to channel 1 and the access point 300a is instructed to exchange immediately to channel 6. Having received instructions, the access points commence communications using the channel that has been exchanged after the next beacon signal. It should be noted that no particular regulation is decided in regard to selection methods for when there are a plurality of channels that can be exchanged.

Figure 16:
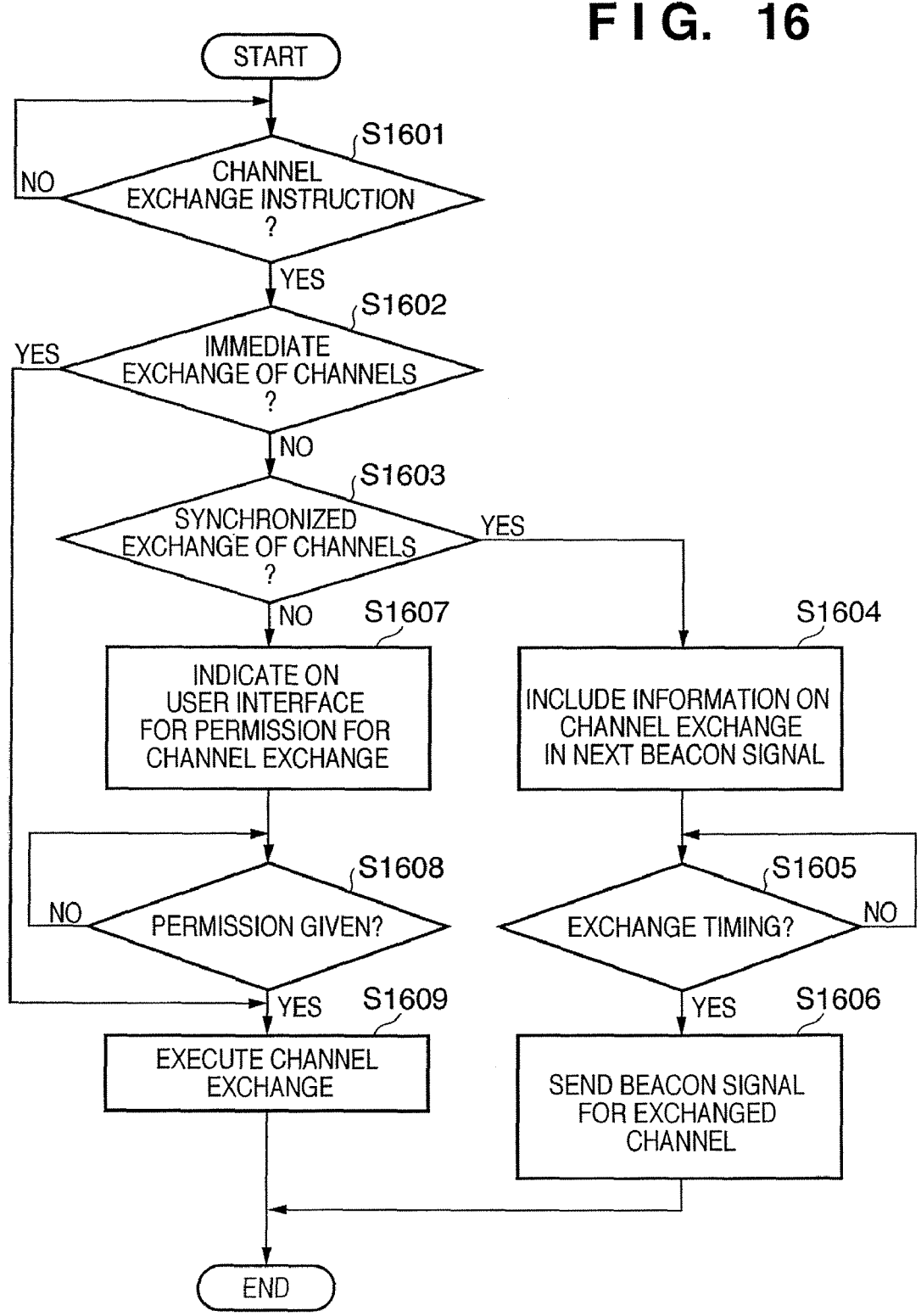
FIG. 16 is a flowchart for describing a channel exchanging process using access points.

FIG. 16 is a flowchart for describing a channel exchanging process using access points according to the present embodiment. When an access point receives an instruction from the system management terminal 200 for a channel exchange and that is an instruction for an "immediate exchange," (when the instruction of step S1005 has been sent), then processing proceeds to steps S1601, S1602, S1609 in this order. At step S1609, an exchange is executed from the next beacon signal to the channel number of the exchange target contained in the channel exchange instruction. Other processes of FIG. 16 indicate processing for when the policy level is "priority" or "normal" and will be described in detail later.

Furthermore, the system management terminal 200 updates (step S905a and 905b) the access point management table 600 (FIG. 6) and the terminal management table 700 (FIG. 7) whenever required with a timing of terminals being associated or bandwidth being assigned.

Furthermore, when the policy level is "no right to obtain bandwidth" at step S1004, the procedure proceeds to step S1010 and bandwidth request is denied. Then, control is conducted such that an assignable bandwidth value (18 Mbps in the above example) is returned as a bandwidth request response (ADDTS response).

Next, description is given of when the policy level is "priority" at step S1004. In this case, processing proceeds to step S1006. At step S1006, a determination is made as to whether or not another terminal is operating on the pre-change channel and the post-change channel. If there is no terminal operating on either channel, then the process proceeds to step S1005 and a channel exchange is executed immediately. On the other hand, if there is a terminal in operation there, then the process proceeds to step S1007 and the channel is changed in line with the beacon timings of the access points so as to lessen the effect of the channel change on other terminals.

The foregoing operation is described in detail with reference to FIG. 13 and FIG. 14.

First, suppose that the bandwidth usage statuses of the wireless stations are as shown in the access point management table 600 of FIG. 13. The access point 300a (AP-a) is using channel 1 and a bandwidth of 8 Mbps is assigned to the wireless station 400a (STA-a). The access point 300b (AP-b) is using channel 6 and a bandwidth of 25 Mbps has been assigned to the wireless station 400c (STA-c). Further still, the access point 300c (AP-c) is using channel 11 and a bandwidth of 54 Mbps is assigned to an unshown terminal group (STA-d and STA-e). It should be noted that in the example of the management table 600 shown in FIG. 13, the access point 400b operates on channel 6 and has an assignable bandwidth of 36 Mbps.

In this state, suppose that the wireless station 400b requests a bandwidth of 20 Mbps. As described above, at step S1003b, channel 6 (the access point 300b) and channel 1 (the access point 300a) are decided as targets for channel exchange. According to the terminal management table 700 (FIG. 7), the policy level of the wireless station 400b (STA-b) is set to "priority" and therefore processing proceeds from step S1004 to step S1006. At step S1006, since there are other wireless stations (STA-a and STA-c) operating on the channels (1 and 6) targeted for exchange, the process proceeds to step S1007.

Figure 14:
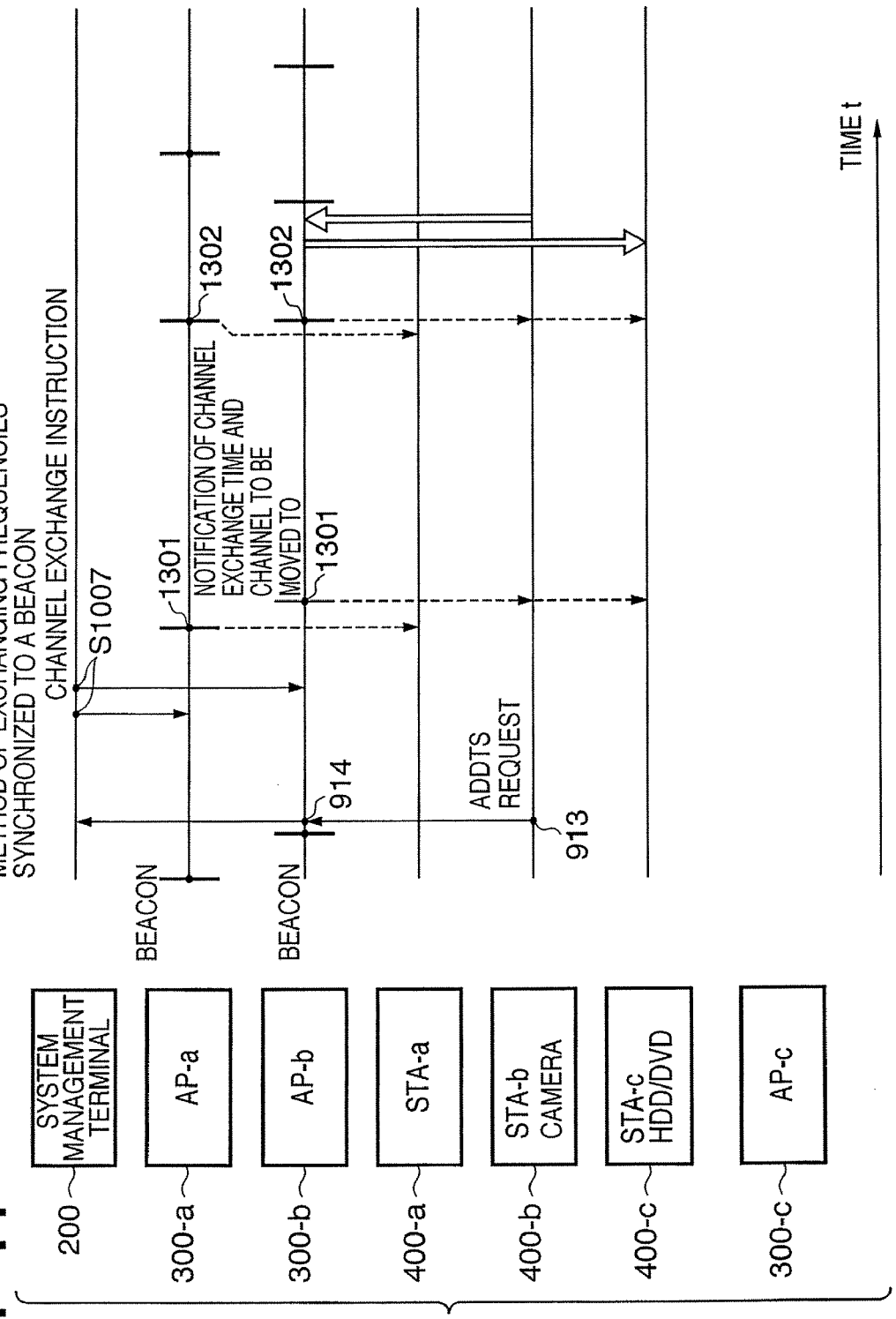
FIG. 14 shows a frequency switching procedure synchronized to a beacon.

FIG. 14 is a diagram for describing channel exchange control executed at step S1007 (procedure when the policy level is "priority"). In FIG. 14 the horizontal axis is given as time and the vertical axis indicates each device (wireless stations and access points) lined up.

When the wireless station 400b issues a bandwidth request (step 913) the access point 300b sends (step 914) the bandwidth request to the system management terminal 200. At the above-mentioned step S1007, the system management terminal 200 sends channel exchange instructions to the access points 300a and 300b. Contained in these channel exchange instructions are the information that this is to be a "channel synchronization exchange," a time for exchanging (channel exchange timing), and the channel exchange target channel.

Having received these channel exchange instructions, the respective access points proceed to the processes of steps S1601, S1602, S1603, and S1604 as shown in the flowchart of FIG. 16. At step S1604, the beacon signal to be issued next is made to contain (step 1301 of FIG. 14) information of "the next beacon sending time (channel exchange timing)," "channel exchange instructions," and "channel number to be moved to." It should be noted that "the next beacon sending time" is set by the "exchange time" contained in the channel exchange instructions sent from the system management terminal 200. Then, when it becomes the channel exchange timing, the process proceeds step S1605 to step S1606 and a beacon signal is sent (step 1302) from the post-exchange channel.

The beacon sent at step 1301 indicates that the channel will move from the next beacon. Accordingly, with the timing instructed by "the next beacon sending time," each wireless station receives a beacon from the post-move channel and is capable of maintaining (step 1302) operations at the new channel.

As described above, by matching the beacon timings of two access points and exchanging channels, an effect is achieved in that the influence is lessened on the operation of the terminals carrying out communications synchronized to the beacon and smooth communications can be achieved.

Next, description is given of when the policy level is "normal."

At step S1004, when the policy level of the wireless station that has requested bandwidth is "normal," the procedure proceeds to step S1008, and a determination is made as to whether or not another terminal is operating on the pre-change channel and the post-change channel. If there is no terminal operating on either channel, then the process proceeds to step S1005 and a channel exchange is executed immediately. On the other hand, when there is a terminal operating there, the procedure proceeds to step S1009 and control is performed so as to execute a channel exchange according to permission of the other terminal.

For example, suppose that the contents of the access point management table 600 are as shown in FIG. 15. That is, the access point 300a (AP-a) is using channel 1 and a bandwidth of 32 Mbps already has been assigned to an unshown wireless station. Accordingly, a further 4 Mbps of bandwidth remain on channel 1. The access point 300b (AP-b) is using channel 6 and a bandwidth of a total of 36 Mbps has been assigned to the wireless stations 400b (STA-b) and 400c (STA-c). Moreover, the access point 300c (AP-c) is using channel 11 and a bandwidth of 54 Mbps has been assigned to an unshown terminal group.

In this state, suppose that the wireless station 400a requests a bandwidth of 8 Mbps. As shown in the terminal management table 700 of FIG. 7, the policy level of the wireless station 400a is set to "normal" and therefore processing proceeds from step S1004 to step S1008. Then, since there are wireless stations in operation on the channels targeted for exchange (channels 1 and 6 in this example), processing proceeds to step S1009. At step S1009, control is performed so that, for example, the channel exchange request is displayed on the display devices of the wireless stations 400b and 400c in operation, and the channel exchange is carried out after an operation is carried out signifying the user's permission.

That is, the channel exchange instructions sent from the system management terminal 200 at step S1009 instruct for a normal exchange of channels, and the access point processing proceeds via step S1601, S1602, and S1603 to step S1607. At step S1607, that there is a channel exchange request is displayed on the display devices of the wireless stations in operation. When an operation is carried out signifying the user's permission, processing proceeds from step S1608 to step S1609 and communications commence using the post-exchange channel after the next beacon signal. It should be noted that when a plurality of terminals are operating, the channel exchange is executed when permission is obtained from all the terminals.

FIG. 9C shows operation of the wireless station 400c after having obtained bandwidth in the above manner. When it is the programmed time, a stream of broadcasted content is sent (step 919) from the tuner 500. The access point 300b receives (IEEE 802.3 controller 307) the stream via the wired LAN 103 and outputs (IEEE 802.11 controller 308) to the wireless station 400c as a wireless signal (step 920). The wireless station 400c receives the stream that has been outputted wirelessly and displays and records this (step 921).

When the programmed time is finished, a reception completion process is carried out (step 922). Namely, the wireless station 400c gives notification (steps 923 and 924) of completion of reception to the tuner 500 via the access point 300b. After this, when the wireless station 400c sends bandwidth deletion notification to the system management terminal 200 via the access point 300b, the access point management table is updated (steps 925 to 927). That is, the value of used bandwidth on the access point management table is updated to a value which is obtained by subtracting the used bandwidth that had been assigned to the wireless station 400c. Furthermore, the remaining bandwidth is updated to a value which is obtained by adding the value of the used bandwidth that had been assigned to the wireless station 400c.

Conventionally, since it could not be known to what extent bandwidth would be consumed until actual usage conditions were reached, operation could not be continued statically constructed as it was, and therefore quality was measured from the commencement of actual communications then channels were moved. Thus, channels were moved after new communications were once commenced, and the new communications also received the influence of the channel movements. In contrast to this, with the present embodiment, consumption of bandwidth is checked and channels are exchanged appropriately prior to commencing new communications, and therefore the probability of the new communications being affected by channel movement is reduced.

That is, with the present embodiment, a wireless station that has requested new bandwidth can carry out communications with sufficient bandwidth from the commencement of communications, which improves the quality of communications (quality of service). Furthermore, rather than always measuring the status of wireless transmission routes in order to move and exchange frequency channels, this is carried out only at the time of bandwidth requests to achieve a desired assignment of bandwidth and therefore the load on the system management terminal 200 is reduced.

It should be noted that in steps S1006 and S1008 of the foregoing embodiment, control was conducted giving consideration only to whether other terminals were operating, but there is no limitation to this. For example, it is also possible to conduct control giving consideration to the policy level of the wireless stations that are operating. In this case, the following manner of control is possible.

When a wireless station having a higher policy level than one's own is conducting communications, set one's own policy level to "no right to obtain bandwidth." It should be noted for example that the policy levels may be set in descending order as "highest priority"→"priority"→"normal"→"no right to obtain bandwidth."

When a terminal having the same policy level as one's own is conducting communications, one's own policy level is set to "no right to obtain bandwidth." Such control offers a first-come, first-served basis.

With the present invention it becomes possible to prevent in advance occurrences of communications deterioration.

Other Embodiments

It should be noted that the present invention also includes cases in which the functions of the foregoing embodiments are accomplished by supplying a software program directly or remotely to a system or a device, and having a computer of the system or device read out and execute the supplied program code. In this case, the supplied program is a program corresponding to the flowcharts shown in the drawings for the embodiments.

Consequently, the actual program code to be installed on a computer to achieve the functional processing of the present invention on the computer may achieve the present invention. That is, the present invention also includes an actual computer program for achieving the functional processing of the present invention.

In this case the program may take any form and may be object code, a program to be executed by an interpreter, or script data supplied to an OS as long as it has the functionality of the program.

The following examples can be given as recording media for supplying the program. For example, this includes floppy (registered trademark) disks, hard disks, optical disks, magneto-optical disks, MO, CD-ROM, CR-R, CR-RW, magnetic tape, nonvolatile memory cards, ROM, DVD (DVD-ROM, DVD-R) and the like.

Additionally, as a technique for supplying the program, a browser of a client computer may be used to connect to a website on the Internet and a program according to the present invention may be downloaded from the website to a recording medium such as a hard disk. In this case, the program that is downloaded may be a file including a compressed file having a self-installing function. Furthermore, it is also possible to achieve the present invention by having the program code that constitutes the program of the present invention divided into a plurality of files and downloading the respective files from different websites. That is, a WWW server that enables a plurality of users to download the program files for achieving the functional processing of the present invention on a computer is also included within the present invention.

Furthermore, the program of the present invention can also be in a form in which it is encrypted and stored on a storage medium such as a CD-ROM for distribution to users. In this case, a user who meets a predetermined condition may be allowed to download from a website via the Internet information of a key that unlocks the encryption and then execute the encrypted program by using the key information and installing the program on a computer.

Furthermore, in addition to achieving the functionality of the foregoing embodiments by having a computer execute the program that has been read out, the functionality of the embodiments may also be achieved in cooperation with an OS or the like running on a computer and based on instructions of the program thereof. In this case, an OS or the like may carry out a part or all of the actual processing and the functionality of foregoing embodiments may be achieved by the processing thereof.

Further still, the program that is read out from the recording medium may be written onto a memory provided in an extension board inserted into the computer or an extension unit connected to the computer to achieve a part or all of the functionality of the foregoing embodiments. In this case, after the program is written to the extension board or extension unit, a CPU or the like pertaining to the extension board or extension unit carries out a part or all of the actual processing based on instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The application claims the benefit of Japanese Patent Application No. 2006-104717, filed Apr. 5, 2006, which is hereby incorporated by reference herein in its entirety.

What is claimed is:

1. A system comprising a plurality of access points and a management apparatus that manages the plurality of access points,
wherein the management apparatus comprises:
a holding unit adapted to hold management information that indicates channels used by each of the plurality of access points and a remaining bandwidth for each channel;
a receiving unit adapted to receive a bandwidth assigning request, that indicates a bandwidth amount to be maintained, from a terminal via a first access point;
a determining unit adapted to determine, based on the remaining bandwidth of a first channel being used by the first access point and the bandwidth amount indicated in the bandwidth assigning request, whether or not bandwidth amount indicated in the bandwidth assigning request is assignable to the first channel being used by the first access point;
a selecting unit adapted to select a second access point that is using a second channel, whose currently assigned bandwidth amount can be assigned to the first channel of the first access point, and to which a total of a bandwidth amount assigned to the first channel by the first access point and a bandwidth amount designated by the bandwidth assigning request can be assigned, in case that the determining unit determines that the bandwidth amount indicated in the bandwidth assigning request is not assignable to the first channel being used by the first access point; and
an exchanging unit adapted to exchange the first channel being used by the first access point and the second channel being used by the second access point selected by the selecting unit, so that the first access point uses the second channel that had been used by the second access point and the second access point uses the first channel that had been used by the first access point.

2. The system according to claim 1, further comprising:
a registering unit adapted to register for each terminal procedure specifying information that indicates procedure to be used of a plurality of types of procedures executable by the exchanging unit,
wherein the exchanging unit executes the channel change according to a procedure specified by the procedure specifying information corresponding to a terminal that has issued the bandwidth assigning request.

3. The system according to claim 2,
wherein in one of the plurality of types of procedures, the exchanging unit causes an immediate exchange in used channels in the first access point and the second access point when a determination of unassignable has been made by the determining unit.

4. The system according to claim 2,
wherein in one of the plurality of types of procedures, the exchanging unit executes a channel exchanging process in such a manner that exchange timings of the channels are matched between the first access point and the second access point when a determination of unassignable has been made by the determining unit.

5. The system according to claim 2,
wherein in one of the plurality of types of procedures, the exchanging unit executes the channel exchanging in response to user operation of terminals conducting communications via the first and second access points when a determination of unassignable has been made by the determining unit.

6. An information processing apparatus for managing a plurality of access points, the apparatus comprising:
a managing unit adapted to manage channels used by each of the plurality of access points and a remaining bandwidth for each channel;
a receiving unit adapted to receive a bandwidth assigning request, that indicates a bandwidth amount to be maintained, from a terminal via a first access point;
a determining unit adapted to determine, based on the remaining bandwidth of a first channel being used by the first access point and the bandwidth amount indicated in the bandwidth assigning request, whether or not bandwidth amount indicated in the bandwidth assigning request is assignable to the first channel being used by the first access point
a selecting unit adapted to select a second access point that is using a second channel, whose currently assigned bandwidth amount can be assigned to the first channel of the first access point, and to which a total of a bandwidth amount assigned to the first channel by the first access point and a bandwidth amount designated by the bandwidth assigning request can be assigned, in case that the determining unit determines that a bandwidth amount indicated in the bandwidth assigning request is not assignable to the first channel being used by the first access point; and an exchanging unit adapted to exchange the first channel being used by the first access point and the second channel being used by the second access point selected by the selecting unit, so that the first access point uses the second channel that had been used by the second access point and the second access point uses the first channel that had been used by the first access point.

7. An information processing method for managing a plurality of access points, the method comprising:
- a managing step of managing channels used by each of the plurality of access points and a remaining bandwidth for each channel;
- a receiving step of receiving a bandwidth assigning request, that indicates a bandwidth amount to be maintained, from a terminal via a first access point;
- a determining step of determining, based on the remaining bandwidth of a first channel being used by the first access point and the bandwidth amount indicated in the bandwidth assigning request, whether or not bandwidth amount indicated in the bandwidth assigning request is assignable to the first channel being used by the first access point;
- a selecting step of selecting a second access point that is using a second channel, whose currently assigned bandwidth amount can be assigned to the first channel of the first access point, and to which a total of a bandwidth amount assigned to the first channel by the first access point and a bandwidth amount designated by the bandwidth assigning request can be assigned, in case that the determining step determines that a bandwidth amount indicated in the bandwidth assigning request is not assignable to the first channel being used by the first access point; and
- an exchanging step of exchanging the channel being used by the first access point and the channel being used by the second access point selected in the selecting step, so that the first access point uses the second channel that had been used by the second access point and the second access point uses the first channel that had been used by the first access point.

8. The method according to claim 7, wherein the exchanging step exchanges the channel according to a procedure corresponding to a terminal that has issued the bandwidth assigning request.

9. A non-transitory computer-readable storage medium storing a control program for executing on a computer the information processing method according to claim 7.

\* \* \* \* \*